Patented May 1, 1923.

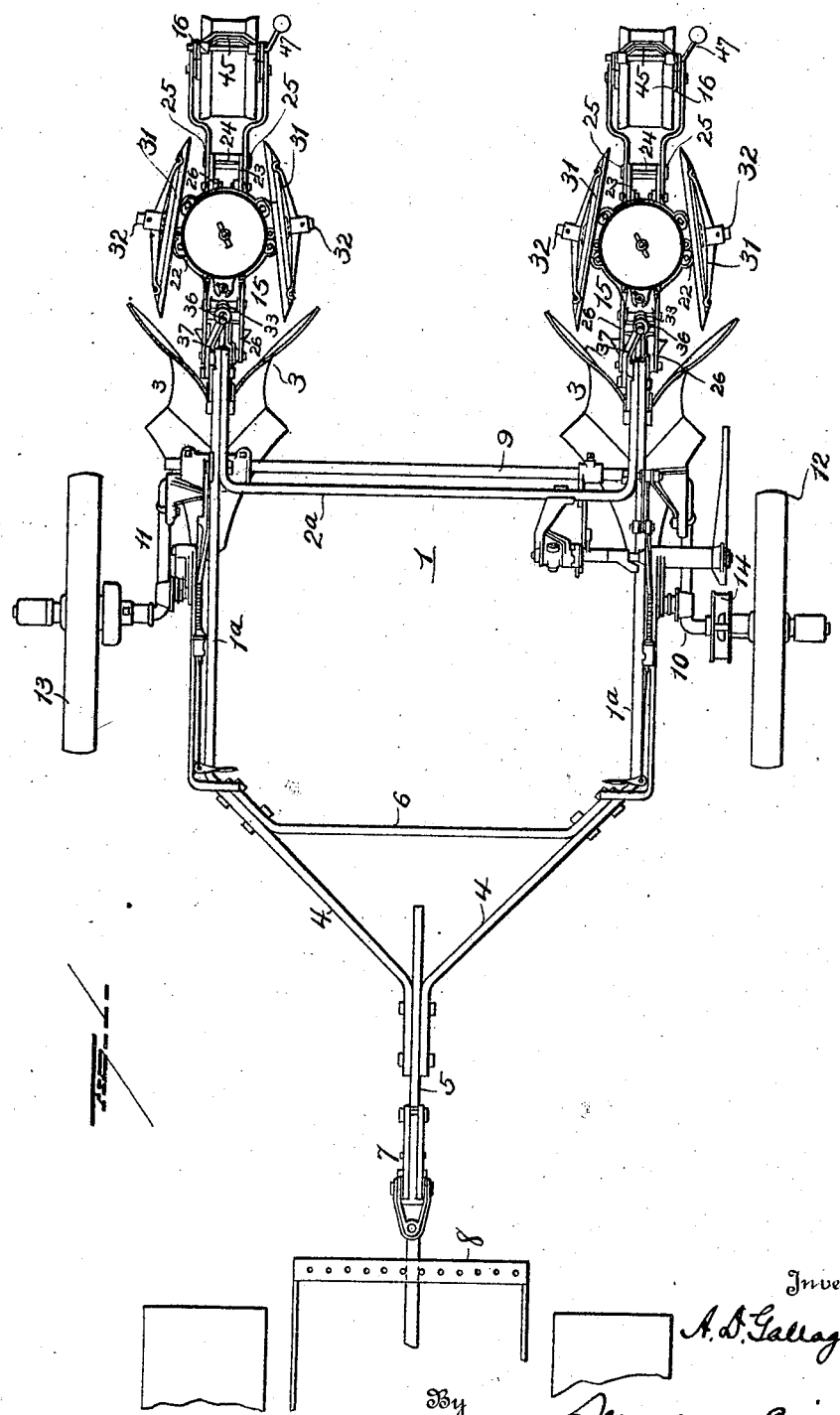

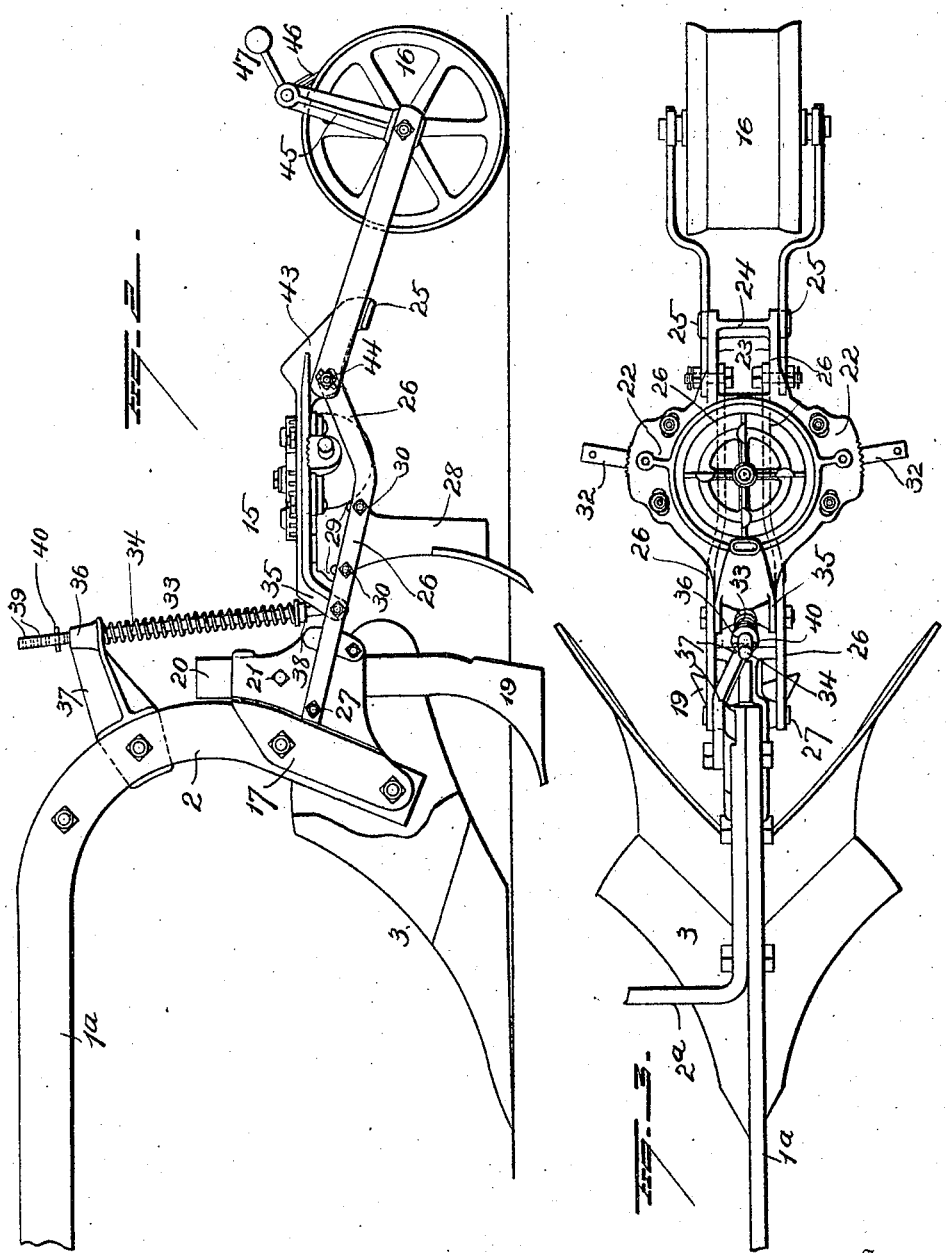

1,453,553

UNITED STATES PATENT OFFICE.

ARTHUR D. GALLAGHER, OF SOUTH BEND, INDIANA, ASSIGNOR TO OLIVER CHILLED PLOW WORKS, OF SOUTH BEND, INDIANA.

COMBINED PLOW AND PLANTER.

Application filed July 23, 1920. Serial No. 398,354.

*To all whom it may concern:*

Be it known that I, ARTHUR D. GALLAGHER, a citizen of the United States, and a resident of South Bend, in the county of St. Joseph and State of Indiana, have invented certain new and useful Improvements in Combined Plows and Planters; and I do hereby declare the following to be a full, clear, and exact description of the invention, such as will enable others skilled in the art to which it appertains to make and use the same.

This invention relates to improvements in combined plows and planters and more particularly to a construction embodying a drill and presser wheel attachment for a two-wheel power lift lister.

When a two-wheel lister plow is connected with a tractor through the medium of a rigid hitch, the lister will partake of the uneven or bobbing movements of the tractor as the latter travels over ground which is not smooth, and if a planter be rigidly connected with the lister plow, such planter would be subjected to the same up and down or bobbing movement and as a result the depth of planting would be uneven.

One object of my invention is to obviate the serious objection of uneven depths of planting when using a planter as an attachment to a two-wheel lister, and to insure uniform depth of planting regardless of bobbing or uneven up and down movements of the lister plow with which said planter is connected.

A further object is to so flexibly connect a planter with a two-wheel power lift lister plow and to so flexibly connect a presser wheel with the planter that both will conform to inequalities of the ground and so that when the plow (or plows) of the lister is raised, said planter and presser wheel shall also be raised.

With these and other objects in view, the invention consists in certain novel features of construction and combinations of parts as hereinafter set forth and pointed out in the claims.

In the accompanying drawings; Figure 1 is a plan view showing a two wheel lister plow connected with a tractor and having a planter and attached presser wheel devices connected with the plow standards at the rear ends of the beams of the lister; Figure 2 is a side elevation on a larger scale showing the connection of the drill with a plow standard and the connection of the presser wheel devices with the drill, and Figure 3 is an enlarged plan of the structure shown in Figure 2.

1 represents the frame of a two-wheel lister plow, the side members $1^a$ of said frame constituting plow beams and their rear ends being bent downwardly to form standards 2 for attachment of plow bases 3 of the double-mold-board or lister type. In the construction shown in the drawing, a brace $2^a$ extends from one side member or beam to the other and the ends of this brace may be extended and bent downwardly to form portions of the standards 2. The forward portions 4 of the frame are made convergent and receive a draw bar 5 which is secured thereto, and a brace 6 may connect the said convergent portions of the frame. Suitable coupling devices as indicated at 7 will be employed to connect the draw bar 5 of the frame with a tractor indicated diagrammatically at 8.

An axle 9 is mounted in suitable bearing devices secured to the frame and cranks 10—11 are provided at respective ends of the axle said cranks having spindle portions for the accommodation of ground wheels 12, 13. Power lift mechanism for raising the plows, shown at 14, is adapted to be actuated from one of the carrying wheels, but as the specific construction of this mechanism does not constitute part of my present invention, it need not be described in detail herein. It will be understood that any other suitable power lift mechanism might be employed without departing from the invention contemplated by the appended claims.

A planter 15 is connected with the rear end of each plow, or rather to the standard at the rear end of each plow beam or side frame-member, and a presser wheel 16 is connected with each drill.

The manner of connecting the planters with the plows and the presser wheels with the planters will now be explained, and as the attachments for both plows are the same, a detail description of one set of attachments will suffice for both.

A bracket 17 is secured to each plow standard and projects rearwardly therefrom. A subsoiler 19 is located directly behind the plow standard, the shank or standard 20 of said sub-soiler being received by the bracket 17 and secured thereto by means of a bolt indicated at 21.

The planter 15 includes in its construction a base plate or casting 22 having rearwardly and downwardly projecting or depending arms 23 connected at their rear ends by a cross bar 24 and having lateral lugs or projections 25.

Draw bars 26 are pivotally connected at their rear ends to the rear portion of the base plate or casting 22 (as at 44) and extend forwardly under the latter and beyond the same, the forward ends of said bars being pivotally connected with the bracket 17 at 27 and in this manner, the planter is pivotally connected with the plow standard. A boot 28, provided near its upper end with slotted ears 29 is disposed between intermediate portions of the draw bars and securely clamped to the latter by means of bolts 30 which pass through said bars and the slotted ears of the boot. The planter is provided at respective sides with covering wheels 31 and journals 32 carried by the base plate or casting, are provided for these wheels.

The planter is held properly to its work, by the yielding pressure afforded by a spring 33. A rod 34 is pivotally connected at its lower end with a forwardly projecting part 35 of the base plate or casting of the drill and supports the presser spring 33,—the upper portion of said rod passing freely through a sleeve 36 at the free end of an arm 37 secured to the plow standard, and the spring bearing at its upper end against said sleeve and at its lower end against a nut or enlargement 38 of said rod. The upper portion of the rod 34 is provided with a plurality of perforations 39, any one of which is adapted to receive a cotter pin 40.

Draw bars 42 for a rear presser wheel 16, are pivotally connected at their forward ends to the rear depending arms 23 of the base plate or casting 22, as indicated at 44 and these draw bars extend over the lateral lugs or projections 25 at or near the free rear ends of said arms 23. Posts 45 project upwardly from the rear portions of the draw bars 42 at respective sides of the presser wheel 16 and support, at or near their upper ends, a pivotally mounted scraper 46 which is kept in contact with the presser wheel by the action of a weighted arm 47.

When the plow is raised by the operation of the power lift mechanism, the planter will be raised through the medium of the rod 34, arm 37 and pin 40 and it will be seen that as the drill rises, the lugs or projections 25 on the rear arms of the base plate or casting will engage the draw bars 42 and raise the presser wheel 16.

My improvements afford a practical planter and presser wheel attachment for a two wheel lister plow, which will be eminently adapted for cooperation with the latter without having transmitted thereto, the bobbing movements incident to the operation of such a plow structure when connected with a tractor. By flexibly connecting the planter with the plow, said planter will accommodate itself to inequality of the ground and, (by reason of such flexible connection) not being affected by the bobbing of the two-wheel lister plow, the depth of planting will be uniform and the presser spring will keep the planter properly to its work in effecting the uniform or even depth of planting. Furthermore, the flexibly supported presser wheel will at all times exert a uniform pressure. And again, the construction is such that notwithstanding the flexible or pivotal connections between the planter and the plow and between the presser wheel and the planter, said planter and presser wheel can be raised when the plow is raised by the power lift mechanism.

Having fully described my invention what I claim as new and desire to secure by Letters-Patent, is:—

1. The combination with a two wheeled lister plow having lifting means, a planter in rear of the plow, and a presser wheel in rear of the planter, of draw bars attached to the planter and pivotally connected with the plow, draw bars for the presser wheel having pivotal connection with the planter, a part cooperable with the plow and with the planter to raise the latter when the plow is raised, and a part carried by the planter and cooperable with the draw bars of the presser wheel for raising the latter when the planter is raised.

2. A planter and presser wheel attachment for a plow, comprising a base casting having rearwardly and downwardly projecting arms provided with lugs, draw bars attached to the rear portion of the base casting and extending forwardly under said base casting, draw bars also pivotally connected with the rear portion of said base casting and extending rearwardly therefrom and over said lugs, and a presser wheel mounted between the rear portions of said last-mentioned draw bars.

3. The combination with a plow and a bracket secured thereto, of a planter in rear of the plow, said planter including a boot, and draw bars pivoted at their rear ends to the rear portion of the planter and pivotally connected at their forward ends to said bracket, the upper portion of said boot being disposed between said draw-bars and secured thereto.

In testimony whereof, I have signed this specification in the presence of two subscribing witnesses.

ARTHUR D. GALLAGHER.

Witnesses:
 ROSE B. MARBAUGH,
 JENNIE M. DAVIS.